April 21, 1925.
H. W. KRANZ ET AL
PICKLING MACHINE
Filed Aug. 4, 1920
1,535,024
5 Sheets-Sheet 3
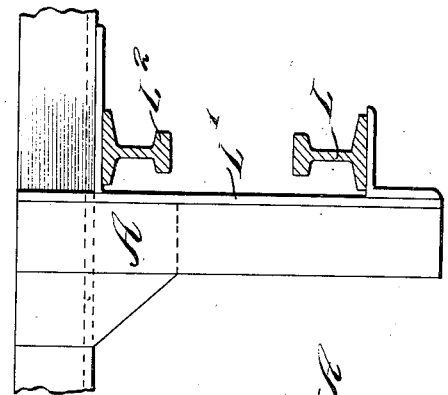
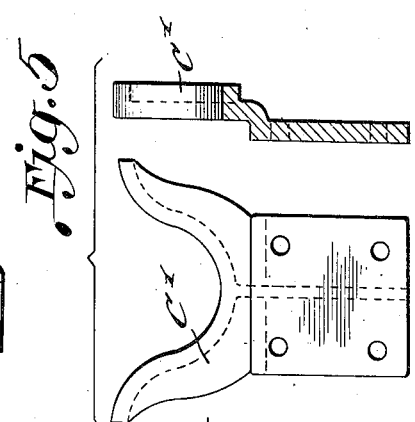
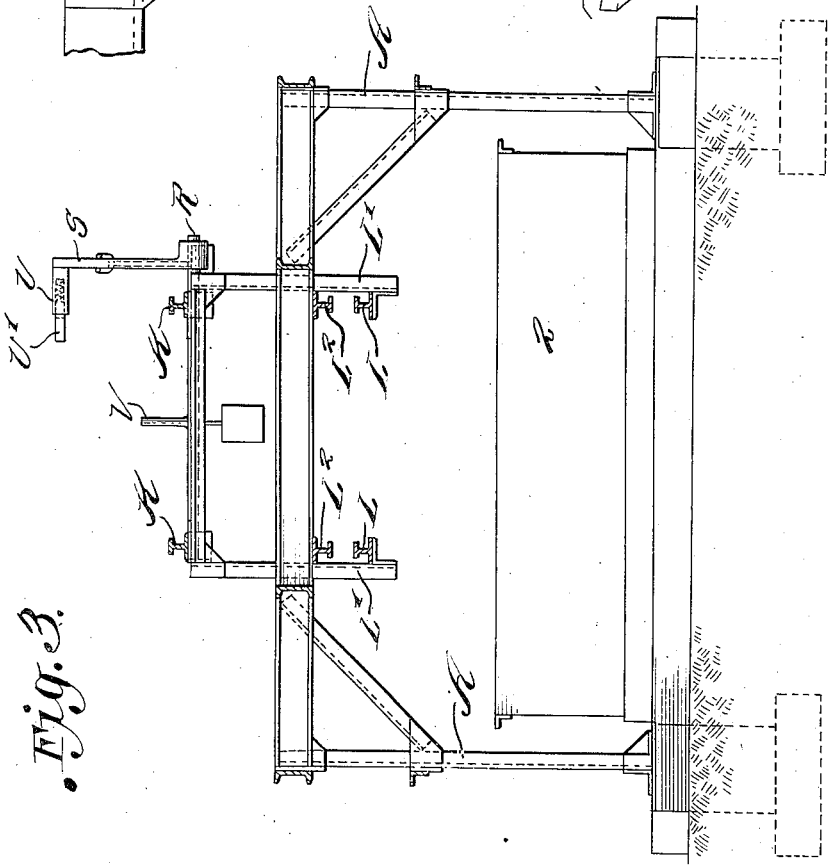
INVENTORS

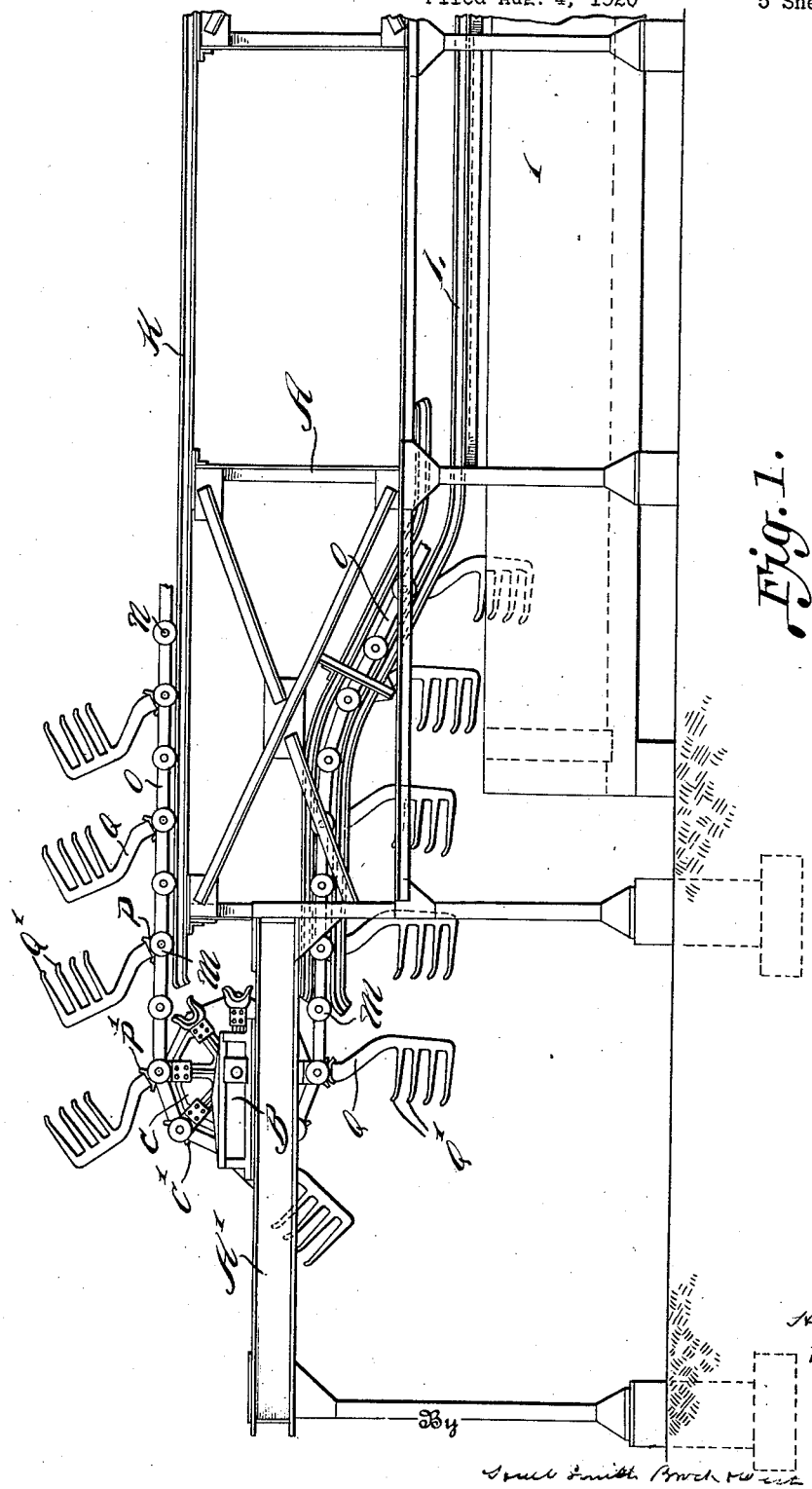

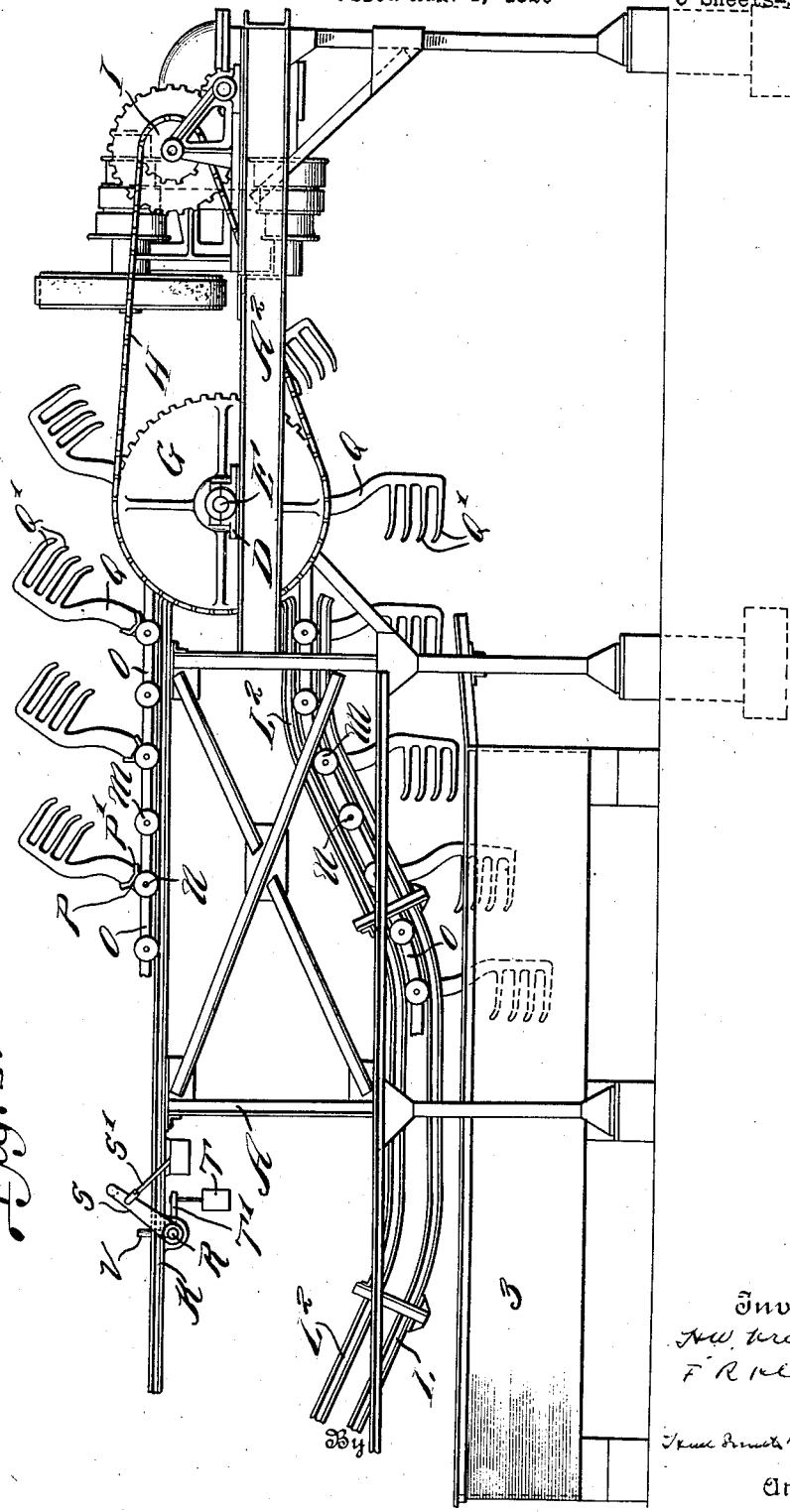

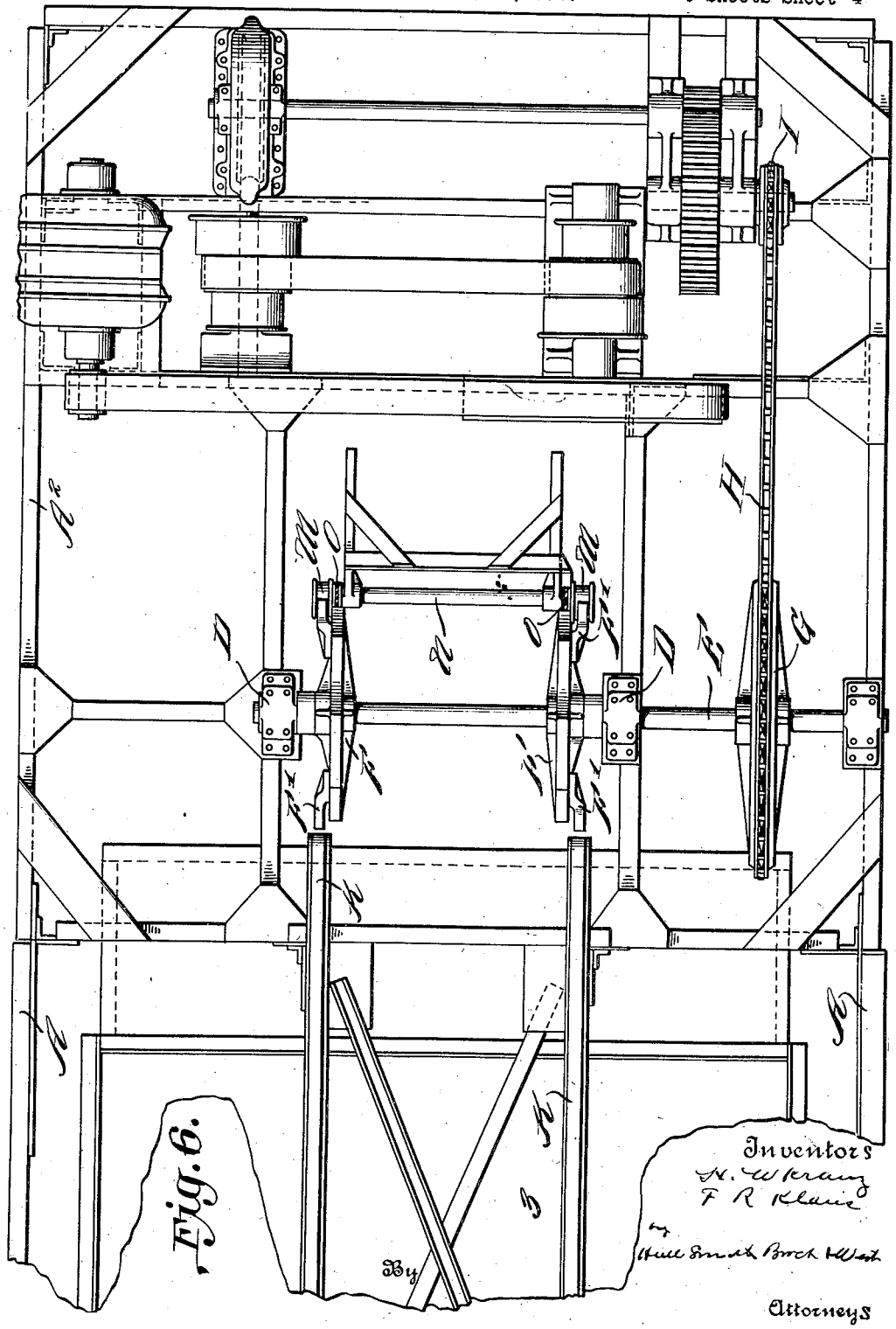

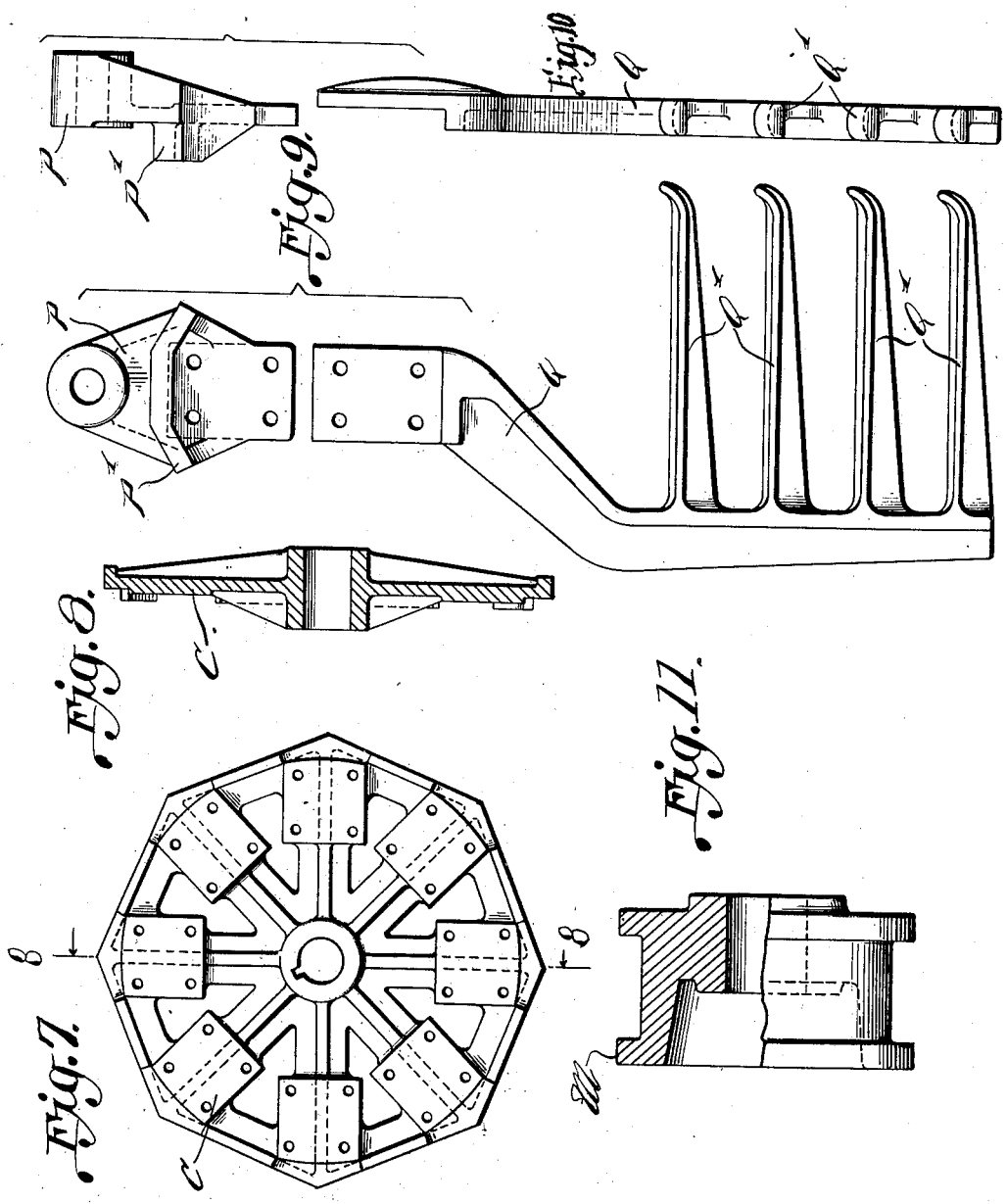

Patented Apr. 21, 1925.

1,535,024

UNITED STATES PATENT OFFICE.

HARRY W. KRANZ AND FRED R. KLAUS, OF CLEVELAND, OHIO, ASSIGNORS TO THE HYDRAULIC PRESSED STEEL COMPANY, OF CLEVELAND, OHIO, A CORPORATION OF OHIO.

PICKLING MACHINE.

Application filed August 4, 1920. Serial No. 401,098.

*To all whom it may concern:*

Be it known that we, HARRY W. KRANZ and FRED R. KLAUS, citizens of the United States, residing at Cleveland, in the county of Cuyahoga and State of Ohio, have invented a certain new and useful Improvement in Pickling Machines, of which the following is a full, clear, and exact description, reference being had to the accompanying drawings.

This invention relates to a pickling apparatus and has for its objects to provide in a single device, an efficient and easily operated apparatus for pickling, cleansing and oiling blanks or billets of sheet metal preparatory to being rolled or otherwise fabricated into articles of manufacture.

Another object of the invention is to provide an apparatus of this nature which shall be continuous, so that the blanks or billets can be placed in the apparatus at one end and delivered in their finished condition at their opposite end, thereby eliminating the labor incidental to intermediate handling and also effecting a considerable saving in time and materially reducing the cost of production of the fabricated article.

With these objects in view, the invention consists in the various novel details of construction and in the manner of combining or arranging the same, all of which will be fully described hereinafter and set forth in the appended claims.

In the drawings forming a part of this specification, Fig. 1 is a side elevation showing the feeding end of the apparatus; Fig. 2 is a similar view showing the delivery end of the same; Fig. 3 is a transverse sectional view taken about mid-way of the length of the apparatus, certain parts being shown in elevation; Fig. 4 is a detail view showing the manner of arranging the guide rails or track; Fig. 5 shows details of the sprocket finger; Fig. 6 is a partial plan view of the delivery end of the apparatus; Fig. 7 is a detail view of one of the sprocket wheels to which the sprocket fingers are connected; Fig. 8 is a detail sectional view on the line 8—8 of Fig. 7; Fig. 9 is a detail view of one of the carrier arms and hanger connected thereto; Fig. 10 is an edge view of the same; and Fig. 11 is a view of one of the rollers.

In the manufacture of automobile rims and similar articles it is usual to cut the sheet metal into strips of proper length to form a rim or band but before the rim is rolled into circular form, the sheet metal strips are given a pickling bath then washed, and then oiled; and these operations have usually been accomplished by placing a number of blanks or billets into a cage or other suitable receptacle, lowering the same into the pickling vat, then removing it and washing the blanks or billets and then placing them into a receptacle containing oil, and then removing and stacking the billets or blanks for use in the fabrication of rims. These separate handlings and operations consume considerable time and require considerable labor and with the idea of saving both time and labor we provide three tanks, 1, 2 and 3 in line with each other, these tanks being preferably composed of wood or other suitable material and suitably dimensioned. The tank 1 is intended to contain the pickling solution which may be a dilute solution of sulphuric acid or other suitable pickling solution. Tank 2 contains water and if preferred it may be given a slight touch of alkali in order to neutralize the pickling solution carried over into receptacle 2 when the blanks or billets are transferred. Oil or similar material is placed in tank 3.

As before stated these tanks are arranged in line, end to end and close together and a frame work A is built so as to extend along and over the series of tanks as most clearly shown in Figs. 1, 2, and 6, and at the forward end this frame has an extension A' and at the rear end has an extension A². Upon the forward extension there is mounted a bearing B in which is journaled a shaft carrying sprocket wheels hereinafter more fully described and which we shall describe as feeding sprockets C, and upon the extension A² there are arranged suitable bearings D in which there is mounted a shaft E carrying delivery sprocket F. Also a sprocket G over which passes a chain H which in turn is operated by the sprocket I preferably receiving power from an electric motor by means of any suitable intermediate power transmitting device or mechanism.

Tracks K are arranged upon the top of the frame and tracks L are supported by the depending members L', both tracks extending from end to end of the frame and the top track is horizontal, whereas the bottom track is undulating as shown so that the blanks or billets can be lowered into and carried through tank 1, then elevated and lowered into tank 2 and moved therethrough, and then elevated out of tank 2 and lowered into tank 3 and carried therethrough and then lifted out of tank 3 and discharged; and in connection with the upwardly and downwardly inclined portions of the track L we employ guide tracks L² arranged in parallel relation with the tracks L and spaced the proper distance therefrom to permit the rollers M to travel thereon.

These rollers are mounted upon the outer ends of the rods N which are connected to the links o constituting the endless chain, and it will be noted that the rods N are arranged between every other pair of links whereas the rollers are arranged at each pivotal connection of the links.

The chains travel around the feed sprockets C and the delivery sprockets F there being sprocket fingers C' and F', respectively, attached to the wheels proper to engage the grooved or flanged rollers M.

As previously stated, the rollers M are mounted upon the outer ends of each rod N and adjacent said ends there are mounted upon each rod hangers P to which are connected carrier arms Q, said carrier arms being bolted to the hanger and it will be noted that each hanger has a flange P' so shaped as to fit the periphery of the sprocket wheels and maintain the arms in their proper positions while traveling around the sprocket wheels and also on the track.

Each carrier arm is formed with a series of laterally extending fingers arranged in parallel series so that a plurality of blanks or billets can be carried by each arm, and it will be noted that these carrier arms are arranged with their fingers extending in such direction that the blanks or billets can be placed therein at the feeding end of the apparatus and automatically dropped or discharged at the delivery end. This is accomplished by means of a peculiar shaped arrangement of the carrying arms in connection with the endless chains and peculiar undulating tracks whereby the blanks or billets can be quickly and easily fed into the machine at the forward end and successively carried into and out of the pickling vat, washing vat, and oiling vat and then dropped by gravity at the rear end of the machine.

After delivering the billet at the delivery end of the machine the arms travel along the upper track and would drop to a receiving or feeding position when passing around the feeding sprocket, but in order to prevent any excessive jerk or jar at this point we prefer to place a tripping device along the upper track and at any suitable point between the feeding and delivery sprocket which device will trip the arms, one pair at a time, from the position shown in Fig. 2 to the position shown in Fig. 1.

This tripping device consists of a horizontal shaft R transversely journaled just beneath the upper track K and provided at its outer end with an arm S which is normally inclined as shown and seats against a forked rest S' attached to its frame, and this shaft R and arms S are normally held in this position by means of a weight T suspended from the end of a horizontal arm T' connected to its shaft R at any suitable point.

The arm S has an inwardly projecting finger U which extends over its track and is provided with an outwardly yielding spring pin U' which pin is engaged by the forward side of the carrier arm Q and forced back as the arm Q moves along, and as soon as said arm has cleared the pin it will be projected inwardly and rest upon the rear side of the arm Q and then as its rod N continues to travel along the track it comes in contact with an upright lever arm V rigidly connected to the shaft R and turns said shaft and also its arm S and the finger U being upon the rear side of the carrier arm Q will move said carrier arm Q from a rearwardly inclined position to a forwardly inclined position, or in other words, causes said carrier arm to flop from the position shown in Fig. 2 to its position shown in Fig. 1, and when the rod N passes over and beyond the lever arm V the weight will pull the shaft R and arm S back to their normal positions ready for engagement with the next succeeding carrier arm Q. By tripping the carrier arms about midway the length of the endless carrier and frame the parts are subjected to less jar and jerk than if the flopping movement occurred at the feeding sprocket.

It will thus be seen that we provide a simple and efficient machine for successfully carrying out the objects hereinbefore referred to.

Having thus described our invention what we claim is:—

1. In a device of the kind described, the combination with a plurality of receptacles, of the upper and lower tracks, an endless carrier traveling upon said tracks and having a plurality of arms, each arm having a plurality of fingers and means for moving said endless carriers, said fingers being arranged to carry a plurality of articles while moving substantially horizontally and discharge said articles when said fingers are shifted to a vertical position at the end of the carrier.

2. In a device of the kind described, the combination with a plurality of receptacles, of a frame and tracks, the lower track being undulatory, the endless carrier having a plurality of arms, and each arm having a plurality of parallel fingers, and means for moving said endless carrier as set forth, said fingers being arranged to carry a plurality of articles while moving substantially horizontally and discharge said articles when said fingers are shifted to a vertical position at the end of the carrier.

3. In a device of the kind described, the combination with a plurality of receptacles, of a frame having a front and a rear extension, sprockets mounted upon said extensions, a lower undulatory track and an upper track carried by the frame, an endless carrier traveling upon said track, said carrier including a plurality of arms each having one or more fingers together with means for moving said endless carrier, said fingers being arranged to carry a plurality of articles while moving substantially horizontally and discharge said articles when said fingers are shifted to a vertical position at the end of the carrier.

4. In a device of the kind described the combination with a carrier, of arms connected to said carrier, and means intermediate the ends of said carrier for shifting the position of said arms.

5. In a device of the kind described the combination with a frame, track and carrier, of arms pivotally connected to said carrier and means interposed intermediate the ends of the carrier for shifting the position of said arms by the movement of the carrier.

6. In a device of the kind described the combination with an endless carrier of shiftable arms connected to said carrier, and means for successively shifting said arms, said means being arranged intermediate the ends of the carrier.

7. In a device of the kind described, the combination with a track and carrier, of arms pivotally connected with said carrier, a shifting arm carrying a movable member adapted to successively engage said carrier arms, and means for operating said shifting arms engaged and operated by said carrier.

8. In a device of the kind described the combination with a track and carrier, of arms pivotally connected with said carrier, a shifting arm supported at one side of track and provided with a movable finger, a shaft to which said arm is attached, a lever projecting from said shaft and engaged by said carrier and means for returning said shaft and shifting arm to their normal positions.

9. In a device of the kind described the combination with a track and carrier, of a transverse shaft having an upwardly projecting lever arm, intermediate its ends, and a shifting arm at its end, said shifting arm having a yieldable finger, a support for said shifting arm, and carrier arms, connected with the carrier adapted to successively engage said shifting arm, said carrier being adapted to engage and move said upwardly projecting lever arm to operate the shifting arm and means for returning the shaft and shifting arm to their normal positions.

In testimony whereof, we hereunto affix our signatures.

HARRY W. KRANZ.
FRED R. KLAUS.